(12) United States Patent
Okamoto

(10) Patent No.: US 7,355,355 B2
(45) Date of Patent: Apr. 8, 2008

(54) DISCHARGE LAMP LIGHTING APPARATUS

(75) Inventor: Masashi Okamoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/783,328

(22) Filed: Apr. 9, 2007

(65) Prior Publication Data

US 2007/0236157 A1   Oct. 11, 2007

(30) Foreign Application Priority Data

Apr. 10, 2006  (JP) .............................. 2006-107104

(51) Int. Cl.
 *G05F 1/00* (2006.01)
(52) U.S. Cl. .................. 315/291; 315/307; 315/209 R; 315/224
(58) Field of Classification Search ............ 315/209 R, 315/209 CD, 209 T, 219, 224–226, 246, 315/276, 283, 291, 307–309, DIG. 7; 313/305, 313/513–515, 594–595, 627
See application file for complete search history.

(56) References Cited

U.S. PATENT DOCUMENTS

| 5,485,061 | A | * | 1/1996 | Ukita et al. .................. 315/307 |
| 5,789,863 | A | | 8/1998 | Takahashi et al. |
| 5,917,558 | A | | 6/1999 | Stanton |
| 6,356,033 | B1 | * | 3/2002 | Okamoto et al. ....... 315/209 R |
| 7,218,065 | B2 | * | 5/2007 | Muramatsu .................. 315/291 |
| 2002/0011807 | A1 | * | 1/2002 | Kobayashi et al. ......... 315/291 |
| 2002/0047610 | A1 | * | 4/2002 | Arimoto et al. ............ 315/246 |
| 2003/0222605 | A1 | * | 12/2003 | Okamoto et al. ........... 315/308 |

FOREIGN PATENT DOCUMENTS

| JP | 02-119005 A | 5/1990 |
| JP | 08-505031 A | 5/1996 |
| JP | 09-161727 A | 6/1997 |

* cited by examiner

*Primary Examiner*—Douglas W. Owens
*Assistant Examiner*—Tung X Le
(74) *Attorney, Agent, or Firm*—Rader, Fishman & Grauer, PLLC

(57) ABSTRACT

In a discharge lamp lighting apparatus for lighting a discharge lamp comprises a starter which generates high voltage at initiation so as to generate dielectric breakdown in the discharge container of the discharge lamp; and a power supply circuit which supply discharge current to the discharge lamp, wherein the power supply circuit has an output current modulation circuit which modulates a magnitude of current flowing through the discharge lamp at least in a steady state, wherein the output current modulation circuit controls a change speed in case a lamp current per square millimeter in a cross section of the cathode electrode is increased, to be 3.9 A per millisecond or less, wherein the power supply circuit carries out control in which an average current in the steady state is set so that an odd-shape portion is formed at a tip of the cathode electrode.

5 Claims, 11 Drawing Sheets

Prior Art

US 7,355,355 B2

DISCHARGE LAMP LIGHTING APPARATUS

CROSS-REFERENCES TO RELATED APPLICATION

This application claims priority from Japanese Patent Application Serial No. 2006-107104 filed on Apr. 10, 2006, the contents of which are incorporated herein by reference in its entirety.

TECHNICAL FIELD

Described herein is a discharge lamp lighting apparatus for turning on a short arc high intensity discharge lamp, that is, a so-called xenon discharge lamp which includes a xenon as the principal component of electric discharge medium, and which is used in an optical apparatus, such as a projector.

BACKGROUND

For example, in a projector for image display like a liquid crystal projector or a DLP (Trademark) projector, a high intensity discharge lamp (HID lamp) is used. In such a projector, by a dichroic prism etc., light is separated into the three primary colors of red, green, and blue, i.e., R, G, and B. A space modulation element provided for each color generates an image of each of the three primary colors, and optical paths thereof is combined by a dichroic prism etc., so as to display a color image.

In another known type of projector, light emitted from a light source is passed through a rotating filter (dynamic color filter) comprising a transmission color wheel having three primary colors (R, G, and B), thereby sequentially generating light rays of the three primary colors. In synchronization with the generated light rays, each of spatial modulation devices is controlled so as to sequentially generate an image of each of the three primary colors thereby displaying a color image.

As the light source for such a projector, a high intensity discharge lamp, such as a high-pressure mercury lamp, and a metal halide lamp, or a xenon discharge lamp, is used. However, in order to generate a high-definition image or a large area screen image in, for example, a movie theater in which good color-reproduction nature is required, a xenon discharge lamp in which light emission spectrum thereof is close to sunlight and a large electric power can be relatively easily realized, is mostly used.

FIG. 13 shows an example of schematic structure of a xenon discharge lamp. In a transparent outer enclosure (10) which is made from a quartz glass material etc. having high heat-resistance and which surrounds an electrical discharge space (Es) in which xenon gas is contained as a main component, a cathode electrode (E1) and an anode electrode (E2) which are made from a high heat-resistant and conductive material such as a tungsten etc. are provided so as to face each other, and, arc discharge is generated between these electrodes. During lighting, since electrons which are emitted from the cathode electrode (E1), and which reaches the anode electrode (E2), release their energy of motion as heat, the anode electrode (E2) produces heat remarkably. Therefore, the anode electrode (E2) needs to be larger than the cathode electrode (E1) in thickness and length by increasing the size thereof, so as to raise the heat dissipation efficiency. The cathode electrode (E1) and the anode electrode (E2) are connected to cathode side and the anode side mouthpieces (03, 05), through metallic foils (02, 04), which are made of such a molybdenum, respectively, for turning on electricity.

In case of a lamp shown in FIG. 13, in order to use efficiently the light emitted from the arc discharge area, a concave mirror which has a paraboloidal face or an ellipse face in a cross-sectional view is provided near the lamp, and the light is led to a following optical system, such as a light tunnel.

On the other hand, FIG. 14 shows a schematic view of an example of the structure of a xenon discharge lamp, in which an outer enclosure (70) surrounding an electrical discharge space (Es) also serves as a concave mirror. Such a xenon lamp is proposed in Japanese Laid Open Patent No. 09-161727. A cathode electrode (E1) is connected to a cathode mouthpiece (64) through electric conduction supports (61, 62, 63) made from a high heat-resistant and conductive material, such as a molybdenum plate etc., and the anode electrode (E2) is directly connected to an anode mouthpiece (65). Since no transparency is needed for an outer enclosure (70), it is made from a high heat-resistant ceramic material such as an alumina etc. However, a window (71) for extracting light is made from transparent material having high strength and high heat resistance such as sapphire etc. Metal covers (66, 67) for air sealing and protection are provided in joint areas of the outer enclosure (70), and the cathode mouthpiece (64) and the anode mouthpiece (65), respectively. Electric supply connection with the cathode mouthpiece (64) and the anode mouthpiece (65) is made through a conductive heat dissipation fin.

In a discharge lamp lighting apparatus for lighting the above-mentioned xenon discharge lamp, upon start-up of the lamp, while a voltage called a no-load open circuit voltage is impressed to the lamp, a high voltage is further impressed to the lamp by a starter, so that in its electrical discharge space, dielectric breakdown is generated, and a rush current with a suitable peak value is supplied thereto, thereby shifting to arc discharge so that lighting is started, and finally, and lighting in a stable steady state may be realized.

Usually, such a discharge lamp lighting apparatus has a converter which adjusts an output of an input power supply to the lamp discharge voltage so that a target lamp current required in order to realize a predetermined electric power applied to the lamp can be outputted. Moreover, the lamp voltage, i.e., the output voltage of the converter, is detected, and a certain unit determines the target lamp current, based on the information, for example, a value of the quotient which is obtained by dividing the target electric power by the detected voltage.

It is desirable that the life span of a light source lamp be long, not only in the above-mentioned projector but also all other uses, so temperature management during lighting is important for the long life span in a xenon discharge lamp. Although it may seem to be advantageous in respect of a long life span if the temperature of each part of the lamp is low, it is not true, that is, when the actual temperature is lower than the optimal temperature, the life span conversely becomes shorter.

In case of a xenon discharge lamp designed so that the temperature of a cathode electrode becomes low during lighting, since there is an effect that consumption (wear) of the cathode due to electric discharge can be controlled, the life span may become longer under condition of a continuous operation of lighting. However, since blackening of a lamp bulb is generated at time of starting of the lamp, there is a problem that the life span thereof becomes shorter than that of the discharge lamp designed so that the temperature of the cathode electrode does not become low during lighting, and this can be easily checked by performing blink lighting. Therefore, so far, lamps have been designed so as to optimize the temperature of a cathode electrode thereof, so that the life span thereof may become longer under the condition of a blink lighting operation.

On the other hand, in order to obtain high color-reproduction performance of a display image, it is important to adjust spectrum distribution of a light source lamp and the conversion form to the color sequential light flux using the above-mentioned dynamic color filter. In the case of the color wheel, it is possible to improve a color-reproduction performance or to carry out a desired color-reproduction performance, by setting up angle distribution of R, G, and B areas of the color wheel (depending on circumstances, W (white) may be added in addition to the R, G, B,)), that is, the rate of a period per rotation during which light transmits through each color area, according to the spectrum of the lamp.

For example, when a B component runs short, it is effective to enlarge the component transmission area thereof, so as to make the rate of a period during which light transmits through the B area, higher than the rates of the other color periods. However, in a DLP type projector, in order to obtain a desired color-reproduction performance by such a method, since the brightness for color of each pixel of a display image is controlled by the duty cycle ratio of each pixel operation of a space modulation element, there is a problem that it is difficult to carry out fine control of pixel tone in the color component whose rate of the period of light transmission is reduced.

In order to solve such a problem, for example, in Japanese Laid Open Patent (Tokuhyo) No. H08-505031, it is proposed that, in an image projection apparatus, a light source drive control unit which changes an output power of the light source, in synchronization with the color of an optical beam outputted from a color changing unit, is provided, so that light source intensity modulation is carried out.

Moreover, in Japanese Laid Open Patent No. H02-119005, a lighting apparatus in which the intensity of light emitted from a light source is adjusted according to the color of a filter area thereof, in synchronization with rotation of a rotation color wheel, is proposed. In addition, although this reference does not relate to a projector but an endoscope apparatus, it is not different from those disclosed in the other references, in that light source intensity modulation operation is added thereto. Therefore, both of them have the same problem which arises from the light source intensity modulation.

Thus, in order to solve above-mentioned problem, it is known that a light source intensity modulation which is synchronized with an operation of a conversion to color sequential light flux which uses a dynamic color filter, is useful. However, especially in the case of a xenon discharge lamp designed so that the temperature of a cathode electrode becomes low, there is a problem of the phenomenon of blackening as described above. In addition, when the lamp is turned on by a discharge lamp lighting apparatus which carries out an output current modulation for such light source intensity modulation, there is a problem that blackening of a lamp bulb tends to occur, and a solution of the problem was not found out.

SUMMARY

The present discharge lamp lighting apparatus or a projector is capable of preventing bulb blackening phenomenon which tends to occur upon lighting based on output current modulation for light intensity modulation, and of preventing bulb blackening phenomenon which tends to occur at an initiation of lamp lighting, even when a xenon discharge lamp is lighted or specifically, when a xenon lamp which is designed so that the temperature of a cathode becomes low, is lighted.

The inventors of the present invention have located the cause either in the case of the bulb blackening phenomenon which tends to occur upon lighting based on output current modulation for light intensity modulation, or in the case of bulb blackening phenomenon which tends to occur at start of lamp lighting. That is, the bulb blackening occurs since the temperature of the cathode electrode which is determined by the balance of the amount of heat given to the cathode electrode by a power applied to the lamp during lighting in a steady state, that is, the average current, and the amount of heat dissipation from the cathode electrode, does not sufficiently reach the temperature at which it is possible to actively cause a phenomenon in which electron emission nature substances, such as a thorium oxide contained inside the cathode electrode, spreads to the outside portion of the arc spot of the cathode electrode surface.

Here, the electron emission nature substance may be oxides, nitrides, nitrides, borides, and carbides, of a thorium, a lanthanum, a cerium, a praseodymium, a neodymium, or a europium. More detailed description will be given below.

Electrons are emitted from metal such as a tungsten which is the material of a cathode electrode, so that an arc discharge current flows. The electrons are emitted either by thermionic emission or through the electron emission nature substance as an agency. In the former case, the temperature of an electrode surface needs to become higher than that in the latter case, so that the arc discharge current flows.

A case where a xenon discharge lamp is turned on according to light source intensity modulation in which low and high lamp currents are passed therethrough is considered below.

Although the temperature of an arc spot section of a cathode electrode is high and the electrons are actively emitted therefrom, the temperature of the outside of the arc spot is lower than that of the arc spot. Here, when the lamp current shifts to a high level state by the light source intensity modulation, if electron emission nature substance does not sufficiently exist outside the arc spot, the density of current flowing through the arc spot section needs to increase, so that the temperature of that portion rises rapidly. This excessive temperature rise gradually raises the temperature of the outside area surrounding the arc spot, through heat conduction, so that thermionic emission is possible, whereby the area of the arc spot is gradually enlarged, and herewith the current density and the temperature of the original arc spot section falls gradually, and the lamp current becomes stable in equilibrium at a high level.

It is considered that during a transition period in which the lamp current shifts to the equilibrium at the high level from the equilibrium at the low, that is, a period in which the temperature of the arc spot section becomes high temporarily, the electrode material of this portion, i.e., the tungsten atom, is evaporated, thereby adhering to the inside of the lamp bulb, whereby a bulb blackening phenomenon occurs.

On the other hand, if an electron emission nature substance sufficiently exists in the outside of the arc spot, when the lamp current shifts to the high level state by the light source intensity modulation, it takes only a short time for the temperature of the outside area surrounding the arc spot to rise by a little, and electron emission begins from the circumference of the outside of the original arc spot immediately, so that the area of the arc spot may be expanded. Therefore, the phenomenon in which the temperature of the arc spot section becomes temporarily high rarely occurs even during a transition period in which the lamp current shifts to the equilibrium at the high level from the equilibrium at the low level so that the evaporation of tungsten atom and the bulb blackening phenomenon does not occur, either. Therefore, it is believed that the bulb blackening phenomenon which tends to occur when the lamp is lighted according to output current modulation for light source intensity modulation, is caused by increasing heat dissipation from the cathode electrode so that the temperature of the cathode electrode declines.

On the other hand, when such a xenon discharge lamp is turned off, it is cooled down while the previous state (the state before the lamp is turned off) in which an electron emission nature substance does not sufficiently exist near the original arc spot, is maintained. After that, in case the xenon discharge lamp is restarted, as described above, and after the starter causes dielectric breakdown in a state where, in general, about 150 V release voltage in no-load state is impressed, the tip of the cathode electrode is quickly heated by applying the rush current thereto, thereby shifting to arc discharge. However, when heating by this rush current is insufficient, there is problem that it cannot shift to stable arc discharge, so that the arc discharge goes out or glow discharge is generated.

Although the current in the case of the glow discharge is small, the electric discharge is generated by a voltage close to a release voltage in no-load state which is relatively high voltage. Since the electric discharge is maintained while xenon ions which are far heavier than an electron are accelerated by the high voltage so as to collide with the cathode electrode, the so-called sputter phenomenon in which tungsten atoms are sputtered from the cathode electrode occurs simultaneously. Therefore, since there is a problem that the sputtered tungsten atoms adhere to the lamp bulb so that a bulb blackening phenomenon is generated when the duration of the glow discharge becomes long, it is necessary to pass the rush current more than the required lower limit therethrough so that it can surely shift to stable arc discharge in one shot.

As described above, although the rush current is a requisite for a definite transition to arc discharge, since cathode electrode material is evaporated by the rapid heating by the rush current as described above, as the lower the limit of the required rush current is, the higher a bulb blackening phenomenon tends to occur. Compared with the case where an electron emission nature substance sufficiently exists at the tip section of the cathode electrode at which an arc spot is formed, when the electron emission nature substance does not sufficiently exist there, since the lower limit of the required rush current becomes high, a bulb blackening phenomenon tends to occur. Therefore, it is considered that the bulb blackening phenomenon which tends to occur at the time of starting of a lamp, is caused, since the temperature of the cathode electrode falls due to increase of the amount of heat dissipation from the cathode electrode.

As described above, it is effective that consumption of the cathode accompanying electric discharge is suppressed when the xenon discharge lamp is designed so that during lighting the temperature of the cathode electrode becomes low, whereby there is an advantage that a long life span of the lamp can be attained. However, even though solutions for the bulb blackening phenomenon which tends to occur when the lamp is lighted on according to output current modulation for the above mentioned light source intensity modulation, and for the blackening bulb phenomenon which tends to occur at the time of starting of the lamp are devised, since the lower the temperature is, the less the amount of the electron emission nature substance which exists on the surface of the tip section of the cathode electrode is, degree of dependence on thermionic emission for maintenance of arc discharge becomes high. Thus, there is a limit in case the temperature of the cathode electrode is lowered.

Furthermore, the inventors of the present invention have found out that a odd-shape portion(s) is formed during part of cumulative elapsed lighting time at the tip section of the cathode electrode under the conditions on which a lamp is turned on so that it may become the optimal temperature in the above-mentioned limit.

FIGS. 15A and 15B show X-ray photographs showing an actual form of such a cathode electrode (E1). The right-hand side portion of the photograph shows the cathode electrode, and the left-hand side portion of the photograph shows an anode electrode. FIGS. 15A and 15B show different lamps, but with the same total cumulative elapsed lighting time of about 200 hours.

In the case of the conventional xenon discharge lamp which is designed so that the temperature of a cathode electrode does not become much low, the tip section of the cathode electrode whose original shape is a cone is getting blunt at the acute section of the tip section, and the tip portion is worn out as a whole while the taper shape thereof is maintained. In the case of a xenon discharge lamp which is designed so that the temperature of a cathode electrode becomes low, odd-shaped portions, such as projections, strumoses, or branch portions which branch into two or more portions at the tip are formed, deviating from the cone shape assumed as a whole, i.e. However, such odd-shaped portions can be observed in ones with cumulative elapsed lighting time of 100-200 hours, but the tendency disappears in ones with cumulative lapsed lighting time of 300 hours or more.

Although reasons that such a phenomenon occurs, are not certain, since there is little amount of the electron emission nature substance which exists on the surface of the tip section of the cathode electrode, it is conceivable that distribution of the current density within an arc spot changes dynamically, so that the flow on the cathode electrode of the fused electrode material is formed, or that a certain re-condensation pattern of the electrode material which has evaporated is developed on the cathode electrode.

Since the temperature of the cathode electrode is determined by balance of the amount of heating to the cathode electrode by the average current at the time of regular lighting, and the amount of heat dissipation from the cathode electrode as described above, it turns out that what is necessary is just to set a certain average current of the discharge lamp lighting apparatus as the conditions under which the odd-shaped section is formed in the tip section of a cathode electrode. Or, conversely, what is necessary is just to design lamps including a cooling structure of the cathode electrode, so that odd-shaped portions may be formed in the tip section of the cathode electrode under the average current specified in the discharge lamp lighting apparatus.

In the xenon discharge lamp shown in FIG. 13, for example, a cathode electrode (E1) is lengthened, or a heat release portion (01) having a increased thickness is provided. In the xenon discharge lamp shown in FIG. 14, the structure thereof can be designed so that an optimum temperature may be realized by, for example, adjusting the size of an electric conduction supports (61, 62, 63).

By using a discharge lamp lighting apparatus in which the current increasing rate is changed, an experiment of a repeated blink lighting operation (a lighting period of 30 minutes and a light off period of 5 minutes) of the above-mentioned xenon discharge lamp which is designed so that the temperature of the cathode electrode becomes low, is conducted. In the experiment, the average lamp current square millimeter (mm$^2$) in a cross-section of the cathode electrode is set to 3.8 A, and further, the rectangle modulation condition is that a cycle is thereof 20 ms, a duty cycle ratio is 50%, and the modulation depth is ±18%, and the degree of the blackening of the lamp bulb after an elapsed time of 480 hour is observed.

In cases that current rise per millisecond and per square millimeter in a cross-section of the cathode electrode (mm$^2$·ms) is 2 A and 2.9 A, no blackening was observed, and in case of current rise of 3.9 A, a blackening could be observed a little but it was not a harmful grade. In case of current rise of 4.5 A, a harmful grade of blackening (adverse effect) was observed. In addition, the current increasing rate was changed by replacing capacitors equivalent to a capacitor (Cf0) shown in FIG. 8 which is described later.

Moreover, as for the degree of the blackening of the lamp bulb, since quantitative measurement was difficult, it was evaluated by visual observation.

Similarly, by using a discharge lamp lighting apparatus in which a rush current is changed, an experiment of a repeated blink lighting operation (a lighting period of 5 minutes and a light off period of 5 minutes) of the above-mentioned xenon discharge lamp which is designed so that the temperature of the cathode electrode becomes low, is conducted. In the experiment, the average lamp current in a steady lighting state per square millimeter (mm$^2$) in a cross-section of the cathode electrode is set to 3.8 A, and further, the degree of the blackening of the lamp bulb after an elapsed time of 360 hour is observed. In case that rush current per square millimeter in a cross-section of the cathode electrode is 17.8 A, a blackening was barely observed, and in case of the rush current of 22 A, a blackening was observed a little but it was not a harmful degree. In cases of rush current of 26.4 A and a rush current of 30.9 A, a harmful degree of blackening was observed. In addition, the rush current was changed by replacing capacitors equivalent to a smoothing capacitor (Cy1) of FIG. 5 which is described later. In view of the above, in a present invention, the problems are solved as set forth below.

A discharge lamp lighting apparatus for lighting a discharge lamp having a discharge container in which discharge medium including xenon is enclosed, and a pair of a cathode electrode and an anode electrode which face each other, in which at least a cathode electrode thereof contains electron emission nature substance, comprises: a starter which generates high voltage at initiation so as to generate dielectric breakdown in the discharge container of the discharge lamp; and a power supply circuit which supply discharge current to the discharge lamp, wherein the power supply circuit has an output current modulation circuit which modulates a magnitude of current flowing through the discharge lamp at least in a steady state, wherein the output current modulation circuit controls a change speed in case a lamp current per square millimeter in a cross section of the cathode electrode is increased, to be 3.9 A per millisecond or less, wherein the power supply circuit carries out control in which an average current in the steady state is set so that an odd-shape portion is formed at a tip of the cathode electrode.

In view of the above, the present discharge lamp lighting apparatus for lighting a discharge lamp having a discharge container in which discharge medium including xenon is enclosed, and a pair of a cathode electrode and an anode electrode which face each other, in which at least a cathode electrode thereof contains electron emission nature substance, comprises: a starter which generates high voltage at initiation so as to generate dielectric breakdown in the discharge container of the discharge lamp; and a power supply circuit which supplies discharge current to the discharge lamp, wherein the power supply circuit has a rush current supply unit which passes rush current through the discharge lamp at initiation, wherein the rush current supply unit supply rush current in form of one or more pulse current whose peak value is 22 A per square millimeter in a cross section of the cathode electrode, and wherein the power supply circuit carries out control in which an average current in the steady state is set so that an odd-shape portion is formed at a tip of the cathode electrode.

Moreover, in the discharge lam lighting apparatus, the power supply circuit includes an output current modulation circuit which modulates a current flowing through the discharge lamp at least in the steady state and the output current modulation circuit controls a change speed in case a lamp current per square millimeter in a cross section of the cathode electrode is increased, to be 3.9 A per millisecond or less.

Furthermore, in a projector which displays a projection image by using color sequential light flux which converted by a dynamic filter from light flux generated by a discharge lamp, the discharge lamp is initiated by the above-mentioned discharge lamp lighting apparatus.

In the above-mentioned output current modulation circuit (Um), since the speed of change of increase of the lamp current per square millimeter in a cross section of the cathode electrode (E1) is controlled to 3.9 A per ms or less, even in case the xenon discharge lamp designed so that the temperature of a cathode electrode becomes low is, turned on, the speed of the increase in lamp current becomes slow, and the phenomenon in which the temperature of the arc spot section become excessively high before the area of the arc spot section increases, is eased. As a result, in the present discharge lamp lighting apparatus, the bulb blackening phenomenon which tends to occur when the lamp is turned on according to the output current modulation for light source intensity modulation can be avoided.

If the rush current supply unit (Ur) supplies a rush current in form of one or more pulses whose peak value is 22 A or less per square millimeter in a cross section of the cathode electrode (E1), even in case the xenon discharge lamp designed so that the temperature of the cathode electrode becomes low, is turned on, the amount of heating which is rapidly applied to the cathode electrode by one pulse of the rush current is limited. As a result, it is possible to prevent the bulb blackening phenomenon which tends to occur at the time of starting of the lamp, in the discharge lamp lighting apparatus.

If the above-mentioned rush current supply unit (Ur) supplies a rush current in form of one or more pulses whose peak value is 22 A or less per square millimeter in a cross section of the cathode electrode (E1), and, if the speed of change of increase of the lamp current per square millimeter in a cross section of the cathode electrode (E1) is controlled to 3.9 A per millisecond (ms) or less, in the present discharge lamp lighting apparatus, the bulb blackening phenomenon which tends to occur when the lamp is turned on according to the output current modulation for light source intensity and the bulb blackening phenomenon which tends to occur which tends to occur at the time of starting of the lamp can be avoided.

If the discharge lamp lighting apparatus for starting and turning on the discharge lamp (Ld) comprises the discharge lamp lighting apparatus (Ex) in the above-mentioned projector according to claim 1 or 2, even in the case that the xenon discharge lamp designed so that the temperature of the cathode electrode becomes low, is turned on, the bulb blackening phenomenon which tends to occur when the lamp is turned on according to output current modulation for light source intensity modulation can be avoided, and/or the bulb blackening phenomenon which tends to occur at the time of starting of a lamp can be avoided.

BRIEF DESCRIPTION OF DRAWINGS

Other features and advantages of the present projector and discharge lamp lighting apparatus therefor will be apparent from the ensuing description, taken in conjunction with the accompanying drawings, in which:

FIG. 6 is a schematic view showing part of a discharge lamp lighting apparatus according to an embodiment of;

DETAILED DESCRIPTION

First, an embodiment will be explained, referring to FIG. 1, which is a schematic block diagram, showing a discharge lamp lighting apparatus according to the present invention.

Figure 1:
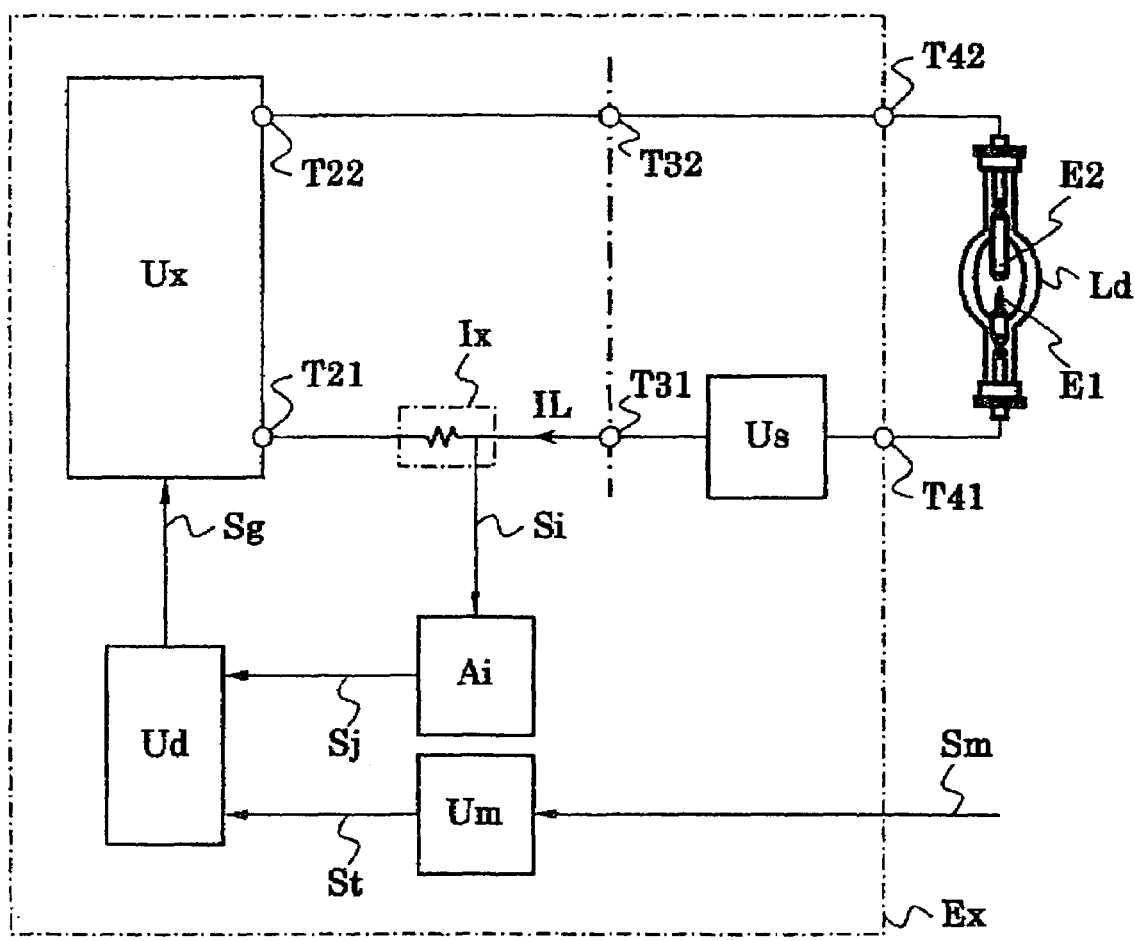
FIG. 1 is a schematic block diagram showing an embodiment of a discharge lamp lighting apparatus.

In FIG. 1, a starter (Us) for generating dielectric breakdown at a time when starting lighting a discharge lamp (Ld) is connected in series to the discharge lamp (Ld), and a power supply circuit (Ux) for supplying a discharge current is connected to the discharge lamp (Ld), and the starter (Us). In addition, since the starter (Us) needs to generate high voltage of about 30 kV, so that it tends to generate a radiation noise, it may be desirable to configure a discharge lamp lighting apparatus (Ex), separating a portion located in a lamp side from nodes (T31, T32), from the other portion.

A lamp current detection signal (Si) outputted from a lamp current detection unit (Ix) provided in order to detect a current which flows to the discharge lamp (Ld) is converted into a lamp current correlation signal (Sj) by a lamp current detection signal converting circuit (Ai) which comprises such as a buffer and amplifier and is provided in order to carry out a conversion so that this signal (Si) may be adjusted with the magnitude of a signal required for a downstream part of the circuit. On the other hand, a lamp current target signal (St) which represents a target value of current which passes through the discharge lamp (Ld) is generated in an output current modulation circuit (Um). The lamp current correlation signal (Sj) and the lamp current target signal (St) are inputted into a power supply capacity control circuit (Ud) for carrying out a feedback control of the power supply circuit (Ux) so that the differences between (Sj) and (St) may become small. The power supply capacity control circuit (Ud) generates a gate driving signal (Sg) whose duty cycle ratio has been modulated, for example, and inputs it to the power supply circuit (Ux). A modulation signal (Sm) is inputted into the output current modulation circuit (Um), thereby carrying out modulation on the lamp current target signal (St). Here, the modulation signal (Sm) is a binary logic signal, and the output current modulation circuit (Um) may determine whether or not the modulation should be carried out in order to raise the lamp current target signal (St), according to the truth or the false of the modulation signal (Sm). Or the modulation signal (Sm) is an analog signal, and the output current modulation circuit (Um) may carry out the modulation in order to raise the lamp current target signal (St), by the value continuously related to the magnitude of the modulation signal (Sm). Furthermore, the modulation signal (Sm) may be digital numeric data of multiple bits which comprise a two or more signal lines, and the output current modulation circuit (Um) may carry out modulation in order to raise the lamp current target signal (St), by a value related to the size of the numeric data value of the modulation signal (Sm). Here, independently of the change speed of the modulation signal (Sm), the output current modulation circuit (Um) limits the change speed of the lamp current target signal (St) and outputs it, so that the speed of change in case that the lamp current per square millimeter in a cross section of the cathode electrode (E1) increases may become 3.9 A per millisecond (ms) or less. In order to realize this, the easiest method is to adjust the response speed of the output current modulation circuit (Um), so as to make it slow. However, since in case the lamp current increases, the speed of change thereof is influenced by a response speed of the power supply circuit (Ux), or a response speed of the power supply capacity control circuit (Ud), it may be determine experimentally when the response speed of the output current modulation circuit (Um) is adjusted.

Thus, when turning on the discharge lamp lighting apparatus of FIG. 1, which is designed so that the temperature of the cathode electrode becomes low, the increase speed of the lamp current becomes low, and the phenomenon in which the temperature of the arc spot section become excessively high before the area of the arc spot section increases, is eased. Thus, in the discharge lamp lighting apparatus, it is possible to avoid the bulb blackening phenomenon which tends to occur when output current modulation for light source intensity modulation is carried out so as to light the lamp.

Next, description of an embodiment will be given, referring to FIG. 2 which is a schematic block diagram showing a discharge lamp lighting apparatus.

Figure 2:
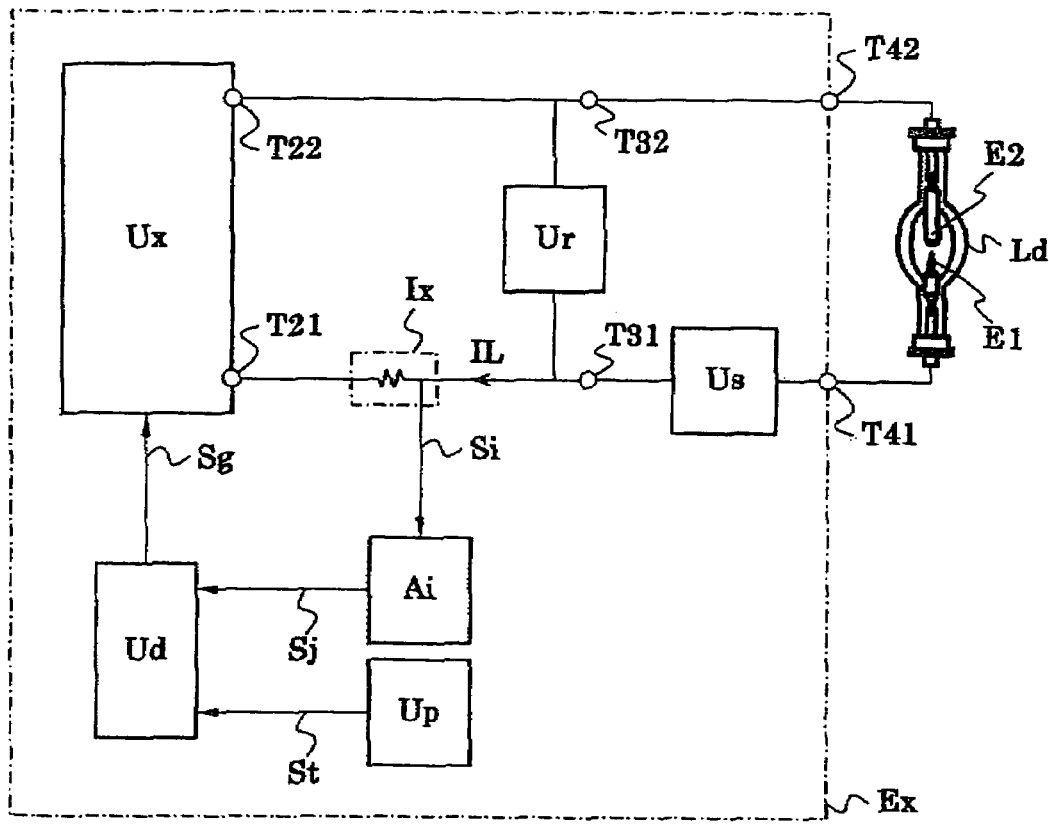
FIG. 2 is a schematic block diagram showing an embodiment of a discharge lamp lighting apparatus.

Similarly to the description of FIG. 1, in a discharge lamp lighting apparatus shown in FIG. 2, a lamp current detection signal (Si) outputted from a lamp current detection unit (Ix) provided in order to detect a current which flows through a discharge lamp (Ld) is converted into a lamp current correlation signal (Sj) by a lamp current detection signal converting circuits (Ai) provided in order to convert the signal (Si) so that this signal may be adjusted a signal with the magnitude required for a latter circuit, such as a buffer and amplifier. On the other hand, a lamp current target signal (St) which represents a target value of the current passed to the discharge lamp (Ld) is generated in a lamp current target signal generation circuit (Up). The lamp current correlation signal (Sj) and the lamp current target signal (St) are inputted into a power supply capacity control circuit (Ud) for carrying out a feedback control of a power supply circuit (Ux) so that the differences between (Sj) and (St) may become small. For example, the power supply capacity control circuit (Ud) generates, for example, a gate driving signal (Sg) whose duty cycle ratio is modulated, and the gate driving signal (Sg) is inputted to the power supply circuit (Ux).

Moreover, at the time of starting, a rush current supply unit (Ur) is provided in order to pass the rush current through the discharge lamp (Ld). In addition, the position of the rush current supply unit (Ur) is not limited to the position shown in FIG. 2, and may be installed in other portions. For example, as described below, it can be also provided in the power supply capacity control circuit (Ud). The rush current supply unit (Ur) supplies the rush current in form of the one or more pulses, whose peak value is 22 A or less per square millimeter in a cross section of the cathode electrode (E1). Here, in case a rush current comprises only one pulse, a smoothing capacitor can serve as it (as described below), by adjusting a circuit constant so that the peak value of the rush current pulse described above may be satisfied.

As described above, when heating by the rush current is insufficient, there is a problem that it cannot shift to stable arc discharge, so that the arc discharge goes out or glow discharge is generated. When two or more rush current pulses need to be passed therethrough for the reason that, for example, the heat capacity of the cathode electrode is large etc., the structure therefor (as described below) is provided so as to add and pass the second pulse or subsequent pulses of the rush current pulses.

If the time intervals of the rush current pulse are too short, since a series of pulses is got together just like one pulse, the effect that the amount of heat which is rapidly applied to the cathode electrode by each rush current pulse is limited is lost. Therefore, there is a possibility that a bulb blackening phenomenon which tends to occur at the time of starting of the lamp cannot be avoided. On the contrary, when the time intervals of the rush current pulse are too long, the electrode may get cold before a following pulse is generated, and when heating by this rush current is insufficient, there is a possibility that the phenomenon caused when heating by the rush current is not sufficient, occurs, that is, it cannot shift to stable arc discharge, so that arc discharge goes out or glow discharge is generated. Therefore, although it is desirable to set the time intervals of the rush current pulses to a range of about 20 to 500 ms, it may be preferably determined by experiment, with the number of the rush current pulses.

Thus, in case that the discharge lamp lighting apparatus shown in FIG. 2 turns on the xenon discharge lamp designed so that the temperature of the cathode electrode becomes low, since the amount of heating which is rapidly applied to the cathode electrode by one rush current pulse is limited, in the present discharge lamp lighting apparatus, the phenomenon of the bulb blackening phenomenon which tends to occur at the time of starting of the lamp can be avoided.

Next, description of an embodiment will be given, referring to FIG. 3, which is a schematic block diagram showing a discharge lamp lighting apparatus.

First of all, the discharge lamp lighting apparatuses described referring to FIGS. 1 and 2 are an example of the constant current control of lamp current, and an example of output current modulation on the basis of constant current control. This may be replaced with one based on constant electric power control of lamp electric power.

Figure 3:
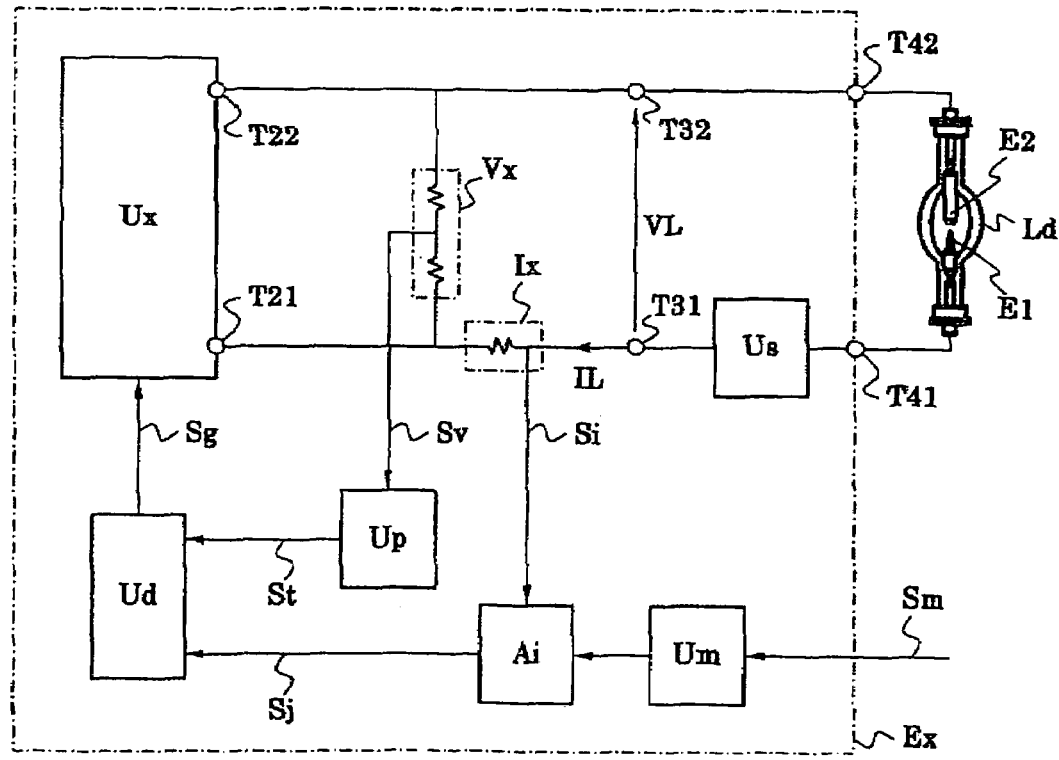
FIG. 3 is a schematic block diagram showing an embodiment of a discharge lamp lighting apparatus.

In the discharge lamp lighting apparatus shown in FIG. 3, a lamp voltage detection unit (Vx) which detects a lamp voltage (VL) and generates a lamp voltage detection signal (Sv) is provided, and a lamp current target signal generation circuit (Up) generates a lamp current target signal (St) which realizes a predetermined lamp electric power target value in response to the lamp voltage detection signal (Sv). Here, the lamp current target signal generation circuit (Up) generates the lamp current target signal (St), for example, by dividing the predetermined lamp electric power target value by the value of the lamp voltage detection signal (Sv). In the circuit arrangement, the lamp current target signal generation circuit (Up) is formed by using a microprocessor, a division operation (calculation) is carried out by a value obtained by converting the lamp voltage detection signal (Sv) (AD conversion), and as described above, the lamp current target signal (St) is generated by a DA conversion.

On the other hand, an output current modulation circuit (Um) into which a modulation signal (Sm) is inputted, is configured so as to act to a lamp current detection signal converting circuit (Ai) for converting a lamp current detection signal (Si) outputted from a lamp current detection unit (Ix) which is provided in order to detect a current which flows through a discharge lamp (Ld). The lamp current detection signal converting circuit (Ai) is preferably configured so as to convert the lamp current detection signal (Si) into the lamp current correlation signal (Sj) which has been modulated according to the modulation signal (Sm). The modulation signal (Sm) is not inputted into the lamp current target signal generation circuit (Up). Even though the lamp current (IL) changes, since in the case of the xenon discharge lamp, change of the lamp voltage (VL) is small, the lamp current target signal generation circuit (Up) continues an operation which generates the lamp current target signal (St) for realizing the predetermined lamp electric power target value, regardless of the state of the modulation signal (Sm). However, the lamp current correlation signal (Sj) modulated according to the modulation signal (Sm) is inputted into a power supply capacity control circuit (Ud), so that the power supply circuit (Ux) is controlled in a feedback manner in response to the influence of the modulation according to the modulation signal (Sm).

However, disturbance of the electric power control due to a small change of the lamp voltage (VL) that occurs when the lamp current (IL) changes, can be avoided by limiting an acquisition timing of the lamp voltage (VL) to specific timing at which it is in a specific modulation state. The specific modulation state means, for example, a state of logical truth, in case the modulation signal (Sm) is a binary logical signal, or, a state where the value is within a specific range in case that the modulation signal (Sm) is an analog signal or multiple bit digital numerical data. Such a specific modulation state does not often occur, and although the frequency of lamp voltage acquisition is too high so that it might be considered that normal power control cannot be carried out, since the lamp voltage during lighting in a steady state after shifting to arc discharge changes very slowly while spending the life span due to electrode wear unless the output current modulation is not carried out, there is no problem even if the frequency of the lamp voltage acquisition is low.

Figure 4:
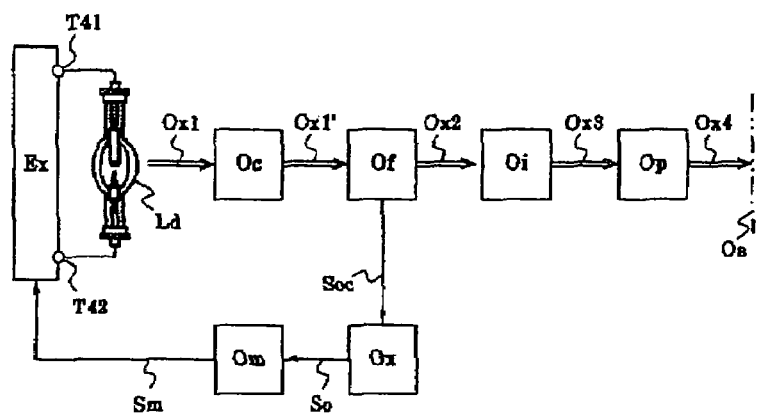
FIG. 4 is a schematic block diagram showing an embodiment of a projector.

FIG. 4 is a schematic lock diagram showing an embodiment of the projector. Light flux (Ox1) emitted from a discharge lamp (Ld), which is started and turned on by a discharge lamp lighting apparatus (Ex) of the embodiment, is converted into color sequential light flux (Ox2) by dynamic color filters (Of), such as a rotation color wheel, through light flux (Ox1') which is passed through a condenser optical system (Oc) including a concave mirror, a condenser lens, etc. provided if needed. The color sequential light flux (Ox2) is modulated by a space modulation element (Oi) which comprises a DMD (Trademark), a LCD, or a LCOS (reflected type liquid-crystal-display panel) etc. into color sequential image light flux (Ox3), and a projection image is formed on a screen (Os) which is provided outside the projector, or which is integrally provided in the projector, by a projection lens (Op).

The image processing unit (Ox) of the projector generates a modulation switching timing signal (So), based on a signal (Soc) from a sensor corresponding to the appearing color information of the dynamic color filters (Of) such as a rotary encoder, and a modulation signal generating section (Om) generates a modulation signal (Sm) so as to transmit it to the discharge lamp lighting apparatus (Ex), whereby the light source intensity modulation according to output current modulation is carried out. Since the discharge lamp (Ld) is turned on by the discharge lamp lighting apparatus (Ex) according to the embodiment, when the xenon discharge lamp designed so that the temperature of the cathode electrode becomes low, is turned on, in the present projector, it is possible to prevent the bulb blackening phenomenon which tends to occur when the lamp is turned on according to output current modulation for light source intensity modulation, and/or the bulb blackening phenomenon which tends to occur at the time of starting of the lamp.

An embodiment of the present invention will be explained below referring to the figures showing more concrete structure. First, the discharge lamp lighting apparatus formed by the circuits shown in FIGS. 5, 6, 7 and 8 will be explained.

Figure 5:
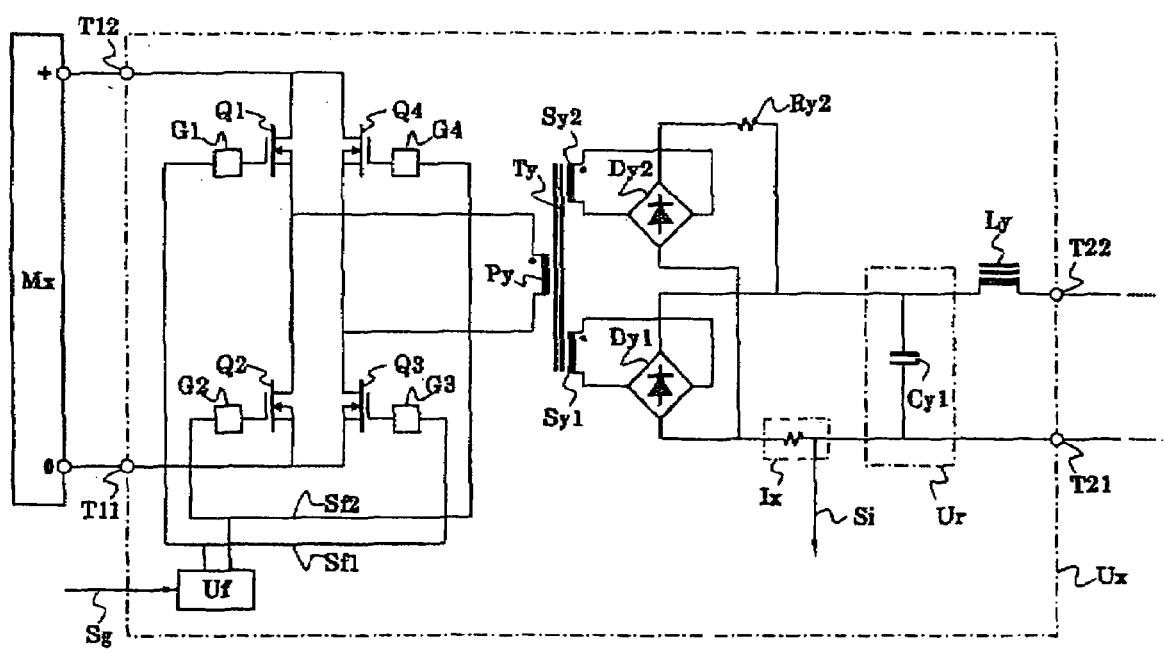
FIG. 5 is a schematic view of part of a discharge lamp lighting apparatus according to an embodiment.

FIG. 5 is a schematic view of an example of a power supply circuit (Ux). The power supply circuit (Ux) is operated in response to supply of voltage from a DC power supply (Mx) which is formed by the so-called PFC etc. which rectifies commercial power and contains an active filter for harmonic current reduction, and performs adjustment of electric power supply to a discharge lamp (Ld). Although the power supply circuit (Ux) shown in the figure has, as an example, a converter which drives the primary side coil (Py) of a transformer (Ty) by a full bridge type inverter, other circuits, for example, a forward converter, a step-down chopper, etc. can also used therefore. A type of the converter is not related to the essence of the embodiment.

The inverter comprises a full bridge circuit which having switching elements (Q1, Q2, Q3, Q4), such as FET. Each switching element (Q1, Q2, Q3, Q4) is driven by a gate driving circuit (G1, G2, G3, G4). The gate driving circuits (G1, G2, G3, G4) are controlled by inverter control signals (Sf1, Sf2) generated by an inverter control circuit (Uf) in response to a gate driving signal (Sg), so that when a pair of diagonal elements, such as, the switching elements (Q1) and (Q3) are in the ON state, the other pair of diagonal elements, that is, the switching elements (Q2) and (Q4) are maintained in an ON state, and conversely when the other pair of diagonal elements switching elements (Q2) and (Q4) are maintained in an ON state, the pair of diagonal elements (Q1) and (Q3) are maintained in the OFF state. When switching the two phases, a dead time, that is, a period in which all the switching elements (Q1, Q2, Q3, Q4) are in an Off state, is inserted. The larger the ratio of a period excluding the dead time, to a period of one cycle of a full bridge inverter operation, that is, duty cycle ratio, the more electric power is transferred from the primary side of the transformer (Ty) to the secondary side thereof.

In case that each of the switching elements (Q1, Q2, Q3, Q4) is formed of MOSFET, a parasitism diode (not shown) whose forward direction is from a source terminal toward a drain terminal is built in each of the elements. However, in case that they are, for example, elements such as bipolar transistors, which do not have any parasitism diode, There is a possibility that these elements may be damaged due to generation of a reverse voltage, when induced current which attributes to an inductance component which exists in part in a downstream side of the inverter (Ui) flows at the time of the above mentioned phase switching period or the dead time. It is desirable to connect a diode which is equivalent to the parasitism diode in reverse-parallel thereto, since these elements may be damaged due to generation of reverse voltage.

An output of the main secondary side coil (Sy1) of the transformer (Ty) is rectified by a diode bridge (Dy1), and a ripple thereof is reduced by a smoothing capacitor (Cy1) and a choke coil (Ly), so as to be supplied as an arc discharge current to the discharge lamp (Ld) through nodes (T21, T22). On the other hand, it is possible to output a relatively high voltage for applying a release voltage in no-load state to the discharge lamp (Ld) before initiation, by setting up the number of turns of an auxiliary secondary side coil (Sy2) of the transformer (Ty) so as to be greater than that of the main secondary side coil (Sy1), and the smoothing capacitor (Cy1) is charged through a diode bridge (Dy2) and a resistor (Ry2). Since a significant current cannot flow through the auxiliary secondary side coil (Sy2) after a starter (Us) is operated so that the discharge lamp (Ld) is initiated and arc discharge current starts flowing, because of the existence of a resistor (Ry2), it is stopped until the next initiation.

In addition, although in FIG. 1, the lamp current detection unit (Ix) for generating a lamp current detection signal (Si) is provided outside the power supply circuit (Ux), if the lamp current detection unit (Ix) is provided on a path through which a large rush current supplied by the electric discharge from the smoothing capacitor (Cy1) flows, during a period in which the lamp voltage falls rapidly at the time of the shifting to the arc discharge in the discharge lamp (Ld), the lamp current detection signal (Si) appears thereon, so that there is a possibility that the power supply capacity control circuit (Ud) in the downstream side thereof carries out a feedback operation, so as to control the lamp current in response to the signal, thereby inducing the discharge to be lost when the rush current stops. Therefore, as shown in FIG. 5, in a practical circuit, it would be desirable that the lamp current detection unit (Ix) not be provided in the path through which the rush current flows. Incidentally, when the discharge goes out or the discharge starts losing, so that the current stops flowing or decreases, the choke coil (Ly) has a function of preventing the discharge from going out by generating high voltage due to the induction effect thereof.

Figure 6:
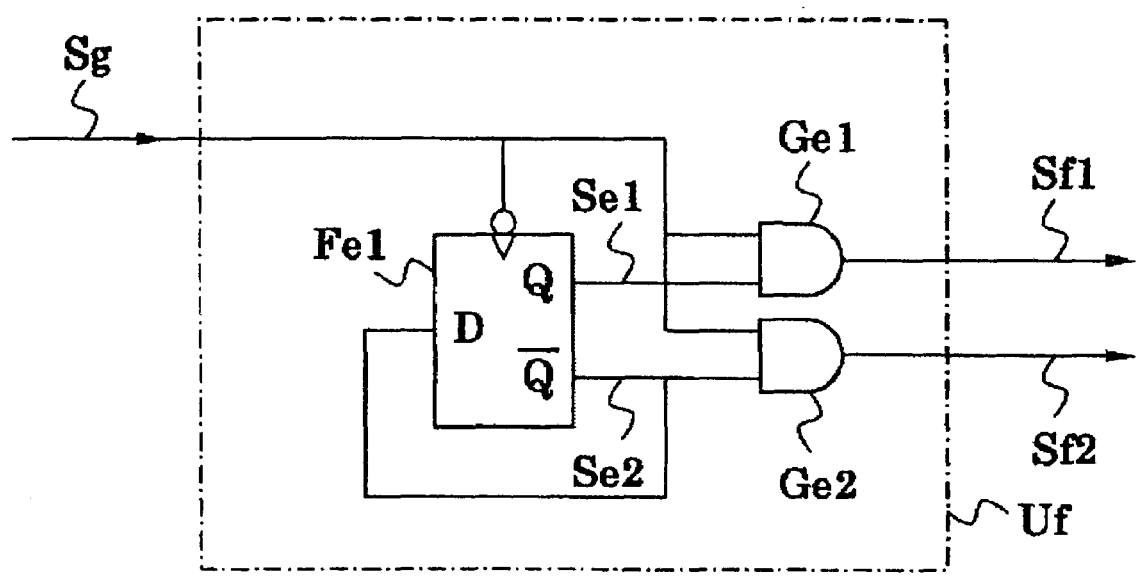

FIG. 6 shows a schematic view of an example of the structure of the inverter control circuit (Uf). The gate driving signal (Sg) sent from the power supply capacity control circuit (Ud) is inputted into a clock signal input terminal of a D flip-flop (Fe1), and an output signal (Se1) and an output signal (Se2) which is the logic inversion of the output signal (Se1) are reversed every time the gate driving signal (Sg) falls. The output signals (Se1, Se2) are inputted into AND gates (Ge1, Ge2) with the gate driving signal (Sg), respectively, so as to generate, therefrom, the inverter control signals (Sf1, Sf2) for driving a full bridge inverter according to the duty cycle ratio of the gate driving signal (Sg).

Figure 7:
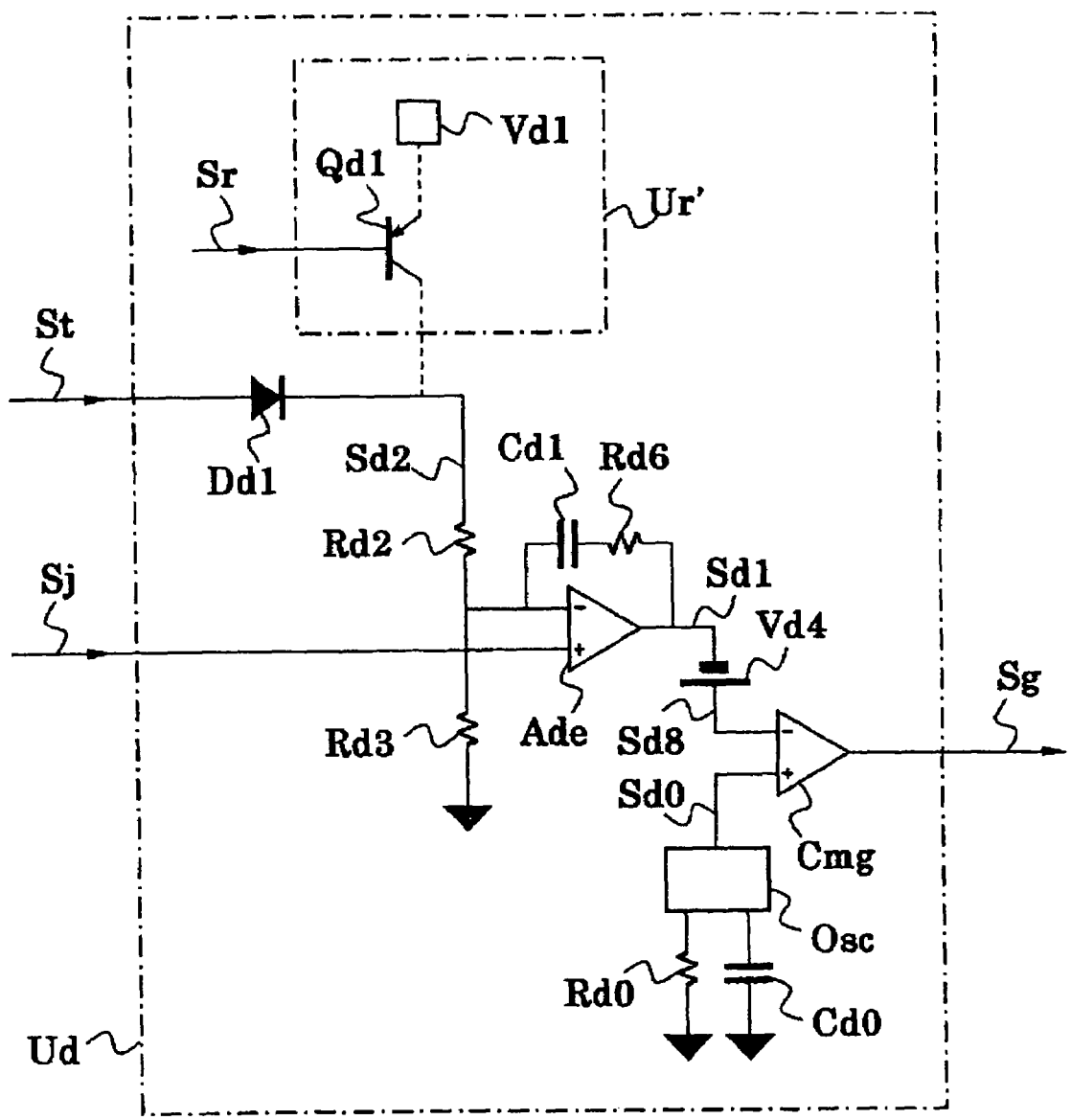
FIG. 7 is a schematic view of part of a discharge lamp lighting apparatus according to an embodiment.

FIG. 7 is a schematic view of an example of the structure of the power supply capacity control circuit (Ud). The lamp current target signal (St) is divided by resistors (Rd2) and (Rd3) through a diode (Dd1), as a converter drive target signal (Sd2), and is inputted into the inverting input terminal of an operational amplifier (Ade). On the other hand, a lamp current correlation signal (Sj) is inputted into the non-inverting input terminal of the operational amplifier (Ade). Since the output signal (Sd1) of the operational amplifier (Ade) is fed back to the non-inverting input terminal thereof through an integrating capacitor (Cd1) and a speedup resistor (Rd6), the operational amplifier (Ade) functions as an error integrating circuit which integrates the difference between the voltage of the lamp current correlation signal (Sj) and the divided voltage of the converter drive target signal (Sd2) by the resistors (Rd2) and (Rd3).

Figure 9:
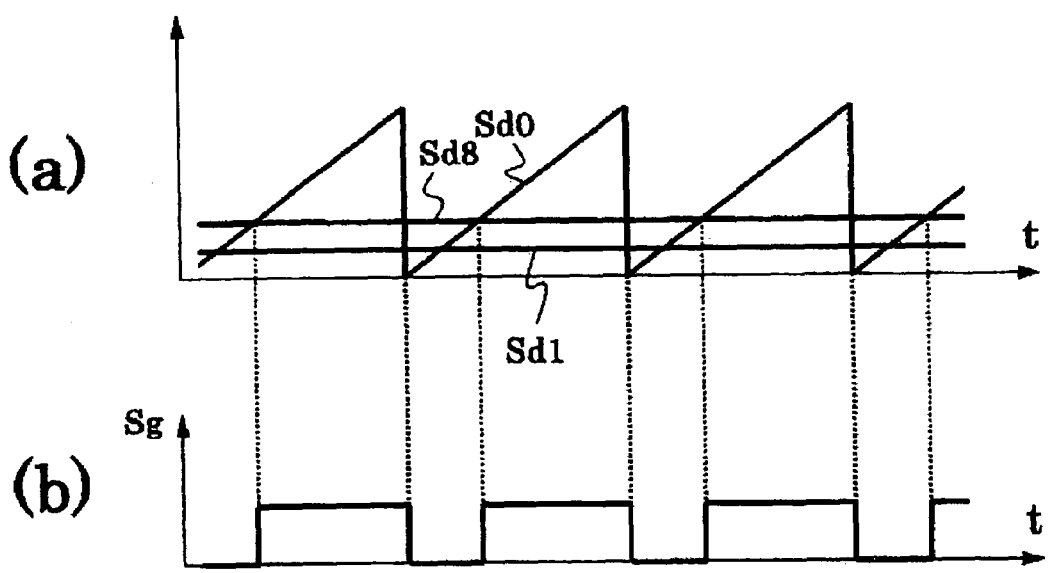
FIG. 9 a schematic timing chart showing an operation of part of embodiment of a discharge lamp lighting apparatus.

An oscillator (Osc) to which a resistor (Rd0) and a capacitor (Cd0) are connected in order to determine a time constant thereof, generates a sawtooth waveform signal (Sd0) as shown in (a) of FIG. 9, and this sawtooth waveform signal (Sd0) and the output signal (Sd1) of the error integrating circuit are compared by a comparator (Cmg). However, upon the comparison, the signal (Sd8) in which an offset voltage (Vd4) is added to the output signal (Sd1) of the error integrating circuit and the sawtooth waveform signal (Sd0) are compared with each other. The gate driving signal (Sg) which becomes high during a period in which the voltage of the sawtooth waveform signal (Sd0) is higher than the voltage of the signal (Sd8), is generated, so as to be outputted from the power supply capacity control circuit (Ud). As described above, since the signal (Sd8) is formed by adding an offset to the output signal (Sd1) of the error integrating circuit, even though the output signal (Sd1) of the error integrating circuit is zero, the duty cycle ratio of the gate driving signal (Sg) is configured so as to be a maximum value which is less than 100%, that is, the maximum duty cycle ratio, or less. In (a) and (b) of FIG. 9, the relation among the output signal (Sd1) of the error integrating circuit, the signal (Sd8) which is formed by adding an offset thereto, the sawtooth waveform signal (Sd0) and the gate driving signal (Sg) is shown.

By inputting the gate driving signal (Sg) outputted from the power supply capacity control circuit (Ud), into the inverter control circuit (Uf), as a result, a feedback control system in which the lamp current correlation signal (Sj) is fed back to an operation of the full bridge inverter, is formed.

Figure 8:
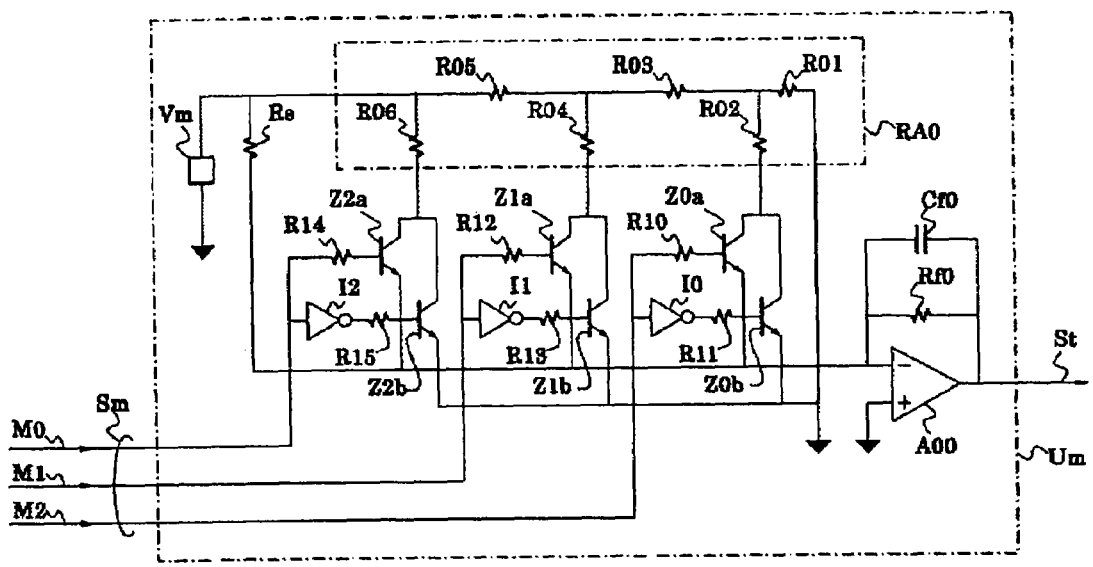
FIG. 8 is a schematic view of part of a discharge lamp lighting apparatus according to an embodiment.

FIG. 8 is a schematic view of an example of the structure of an output current modulation circuit (Um). An output (terminal) of a voltage source (Vm) which has suitable voltage is connected to the inverting input terminal of an operational amplifier (A00) through a resistor (Rs). Since the lamp current target signal (St) which is an output of the operational amplifier (A00) is fed back to the inverting input terminal thereof through a resistor (Rf0) and a capacitor (Cf0) provided in parallel to the resistor (Rf0), the operational amplifier (A00) generates the lamp current target signal (St) which has a component proportional to the voltage of the voltage source (Vm) depending on the resistance of the resistor (Rs).

In this figure, the modulation signal (Sm) is in form of (three bit) modulation data (M0, M1, M2). An ON/OFF state of each of switching elements (Z0a, Z1a, Z2a) is controlled corresponding to the truth and false of each bit of the modulation data (M0, M1, M2). On the other hand, since inverters (I0, I1, I2) are inserted in the bases of switching elements (Z0b, Z1b, Z2b), respectively, if one of the switching element (Z0a) and the switching element (Z0b) is an ON state, the other is in an OFF state, and if one of the switching element (Z1a) and the switching element (Z1b) is an ON state, the other is in an OFF state, and one of the switching element (Z2a) and the switching element (Z2b) is in an ON state, the other is in an OFF state, respectively.

The switching elements (Z0a, Z0b), the switching elements (Z1a, Z1b), and the switching elements (Z2a, Z2b) are connected to resistors (R02), (R04), and (R06) of a resistor rudder network (RA0) which comprises resistors (R01, R02, R03, R04, R05, R06), respectively, in which current flowing through the switching element (Z0a, Z1a, Z2a) flows into the inverting input terminal of the operational amplifier (A00). The lamp current target signal (St) which has a component proportional to the voltage of the voltage source (Vm) is generated, depending on the digital values of the modulation data (M0, M1, M2), based on the theory of a DA conversion circuit. However, all the resistances of resistors (R01, R02, R04, R06) are equal to each other, and the resistances of the resistors (R03, R05) is set to a half the resistance of the resistors (R01, R02, R04, R06). The circuit described above can be configured, by using an IC for DA conversion.

In the above structure, the lamp current target signal (St) is generated, so that a value thereof depending on the digital values of the modulation data (M0, M1, M2) is superimposed on a basic value depending on the resistance of the resistor (Rs). However, the modulation data (M0) serves as the least significant bit, and the modulation data (M2) serve as the most significant bit. The ratio of the depth of modulation, that is, a difference between a value of the lamp current target signal (St) at a time of a maximum modulation and a value of the lump current target signal (St) at a time of minimum modulation, to the value of the lamp current target signal (St) at the time of the maximum modulation, is set by resistance of the resistor (Rs). Moreover, the value of the lamp current target signal (St) at the time of the maximum modulation can be set up by an output voltage of the voltage source (Vm).

As to a response speed of the circuit shown in the figures, in order to control the speed of change to be 3.9 per square millimeter and per millisecond (A/mm$^2$) in a cross section when the lamp current increases by increase of the digital value of the modulation data (M0, M1, M2), setting of the capacity of the capacitor (Cf0) is adjusted. The larger the electrostatic capacity is, the slower the speed of change becomes.

In order to realize restriction of the speed of change in case the lamp current increases, in addition to a setup of the electrostatic capacity of the capacitor (Cf0), in case when the modulation signal (Sm) is the multiple bit digital numeric data, when the modulation data (M0, M1, M2) is incremented, it may be possible to increase the modulation data (M0, M1, M2) by 1 LSB every certain suitable time interval rather than to increase directly from a certain value to another value.

As described above, in the discharge lamp lighting apparatus configured by using the circuit shown in FIGS. 5, 6, 7, and 8, even in the case the xenon discharge lamp designed so that the temperature of the cathode electrode becomes low is turned on, the degree of the increase speed of the lamp current becomes low, and the phenomenon in which the temperature of the arc spot section becomes excessively high before the area of the arc spot section increases, is eased. Thus, in the discharge lamp lighting apparatus, it is possible to prevent the bulb blackening phenomenon which tends to occur when output current modulation for light source intensity modulation is carried out. Thus, it is possible to offer a discharge lamp lighting apparatus, capable of avoiding the bulb blackening phenomenon which tends to occur when output current modulation for light source intensity modulation is carries out so as to light the lamp.

Moreover, as described above, since a rush current is supplied from the smoothing capacitor (Cy1) flows, during a period in which the lamp voltage falls rapidly at the time of the shifting to the arc discharge in the discharge lamp (Ld), the smoothing capacitor (Cy1) can serve as a rush current supply unit (Ur).

Figure 10:
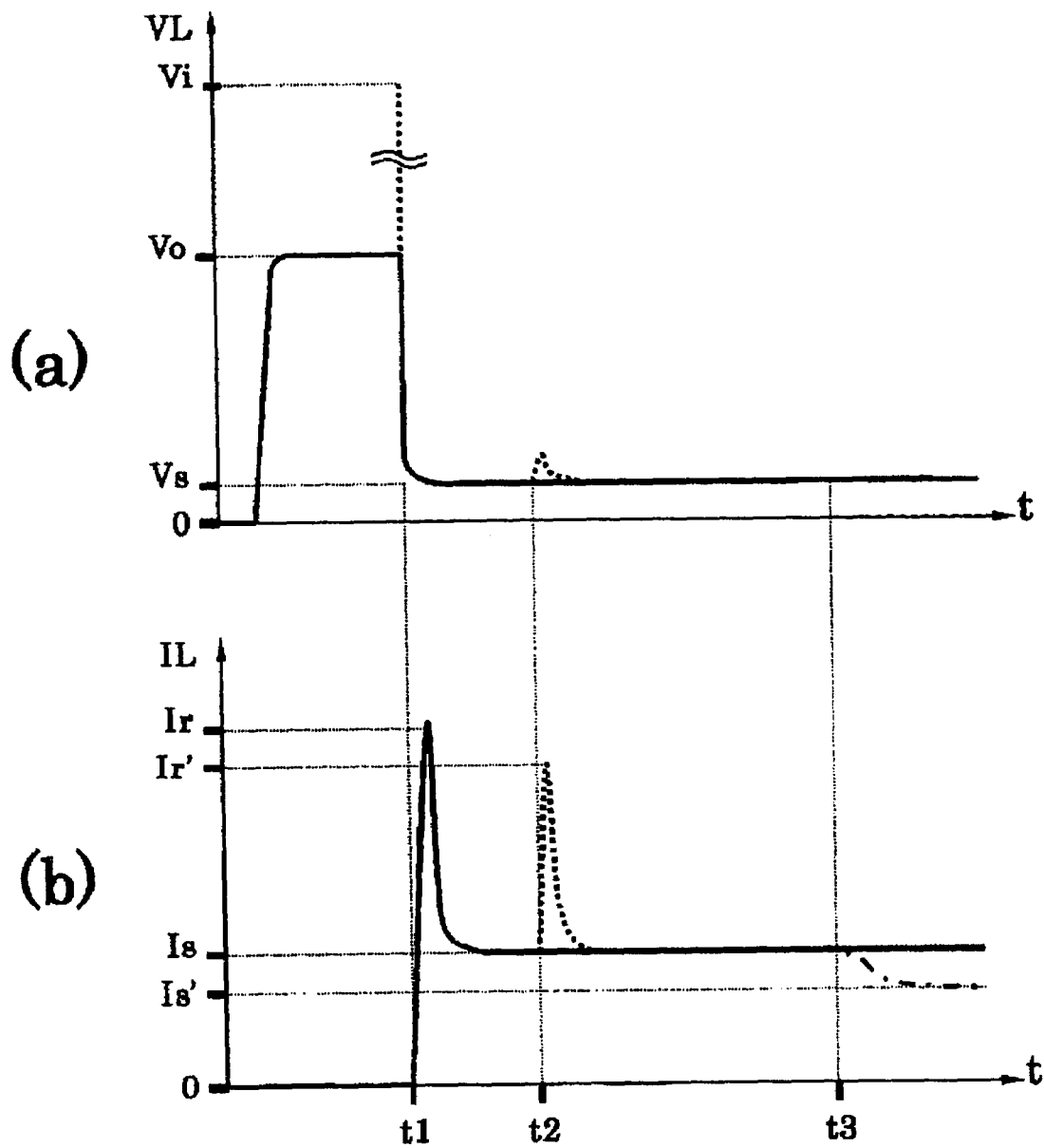
FIG. 10 is a schematic view showing an operation of an embodiment of a discharge lamp lighting apparatus.

FIG. 10 is a timing chart of a rush current shown by a solid line. In FIG. 10, (a) shows a lamp voltage (VL), and (b) shows a lamp current (IL). While a release voltage in no-load state (Vo) is applied to a lamp, a starter is operated at time (t1), whereby electric discharge begins in the lamp and the lamp voltage falls rapidly to arc discharge voltage (Vs). The electric charges charged by the release voltage in no-load state in the smoothing capacitor (Cy1) flows out, so that the rush current pulse is superimposed on an arc discharge current (Is), whereby the lamp current with the lamp current peak value (Ir) is generated.

Therefore, since the electrostatic capacity of the smoothing capacitor (Cy1) is set so that this peak value (Ir) is 22 A/mm$^2$ or less in a cross section of the cathode electrode (E1), even in the case that the xenon discharge lamp designed so that the temperature of the cathode electrode becomes low is turned on, the amount of heating which is rapidly applied to the cathode electrode by one rush current pulse is limited, and it is possible to prevent the bulb blackening phenomenon which tends to occur at the time of starting of the lamp, in the discharge lamp lighting apparatus.

In case that the rush current comprising a couple of pulses is required, for example, as shown by a dot-dash line of FIG. 7, it is possible to easily realize such rush current pulses by adding an additional inrush current control circuit (Ur'), in which a voltage source (Vd1) having suitable voltage is connected to the resistor (Rd2) for dividing the voltage, through a transistor (Qd1). And in the case the two or more rush current pulses are passed, by activating an additional rush current enabling signal (Sr) applied to the base of the transistor (Qd1) only for a fixed period, the voltage of the voltage source (Vd1) is impressed to the resistor (Rd2) during that period.

Since, by this operation, the voltage of the converter drive target signal (Sd2) between connection nodes of a resistor (Rd2) and a diode (Dd1) turns into a voltage depending on the voltage source (Vd1) independently of the lamp current target signal (St), the current which flows through the discharge lamp (Ld) can be increased pulse-wise. In addition, when the smoothing capacitor (Cy1) and the additional inrush current control circuit (Ur') are combined as in this structure, it is regarded that a rush current supply unit (Ur) is formed.

The waveform of the current in case that the additional rush current enabling signal (Sr) is activated at time (t2), is shown in a broken line of FIG. 10. In addition, since the peak value (Ir') of the second rush current pulse or the subsequent pulses needs not be the same as the peak value (Ir) of the first rush current pulse, and since the second or subsequent pulses are passed through after the temperature of the cathode electrode is raised by the first rush current pulse, it is desirable that the peak value (Ir') be rather lower. Incidentally, as shown in a dot-dash line of FIG. 10, at time (t3) at which heating is fully stabilized at an early stage of lighting by the lamp current (Is), the lamp current may be controlled so as to shift to an arc discharge current (Is') in an original steady state.

The additional rush current enabling signal (Sr) is generated as set forth below. For example, by detecting that the lamp current detection signal (Si) from the lamp current detection unit (Ix) becoming the predetermined value or more, or by detecting the lamp voltage detection signal (Sv) from the lamp voltage detection unit (Vx) becoming a predetermined value or less, a timer circuit starts a counting operation, and a monostable multivibrator generates pulses having a fixed period when the time circuit completes the counting operation, and further, the additional rush current enabling-signal generation circuit (not shown) is configured so that an output signal of the monostable multivibrator turns into the additional rush current enabling signal (Sr). In addition, in case that the function of passing two or more rush current pulses according to the additional inrush current control circuit (Ur'), is not added, the diode (Dd1) is not necessary.

In the above structure, the time width of the additional rush current enabling signal (Sr) and the voltage of the voltage source (Vd1) are set up, so that the peak value (Ir') is 22 A/mm$^2$ or less in a cross section of the cathode electrode (E1), so that and, therefore, even in case the xenon discharge lamp designed so that the temperature of the cathode electrode becomes low is turned on, the amount of heating which is rapidly applied to the cathode electrode by one rush current pulse is limited, whereby it is possible to offer an a discharge lamp lighting apparatus capable of avoiding the bulb blackening phenomenon that tends to occur at initiation of a lamp lighting operation.

Figure 11:
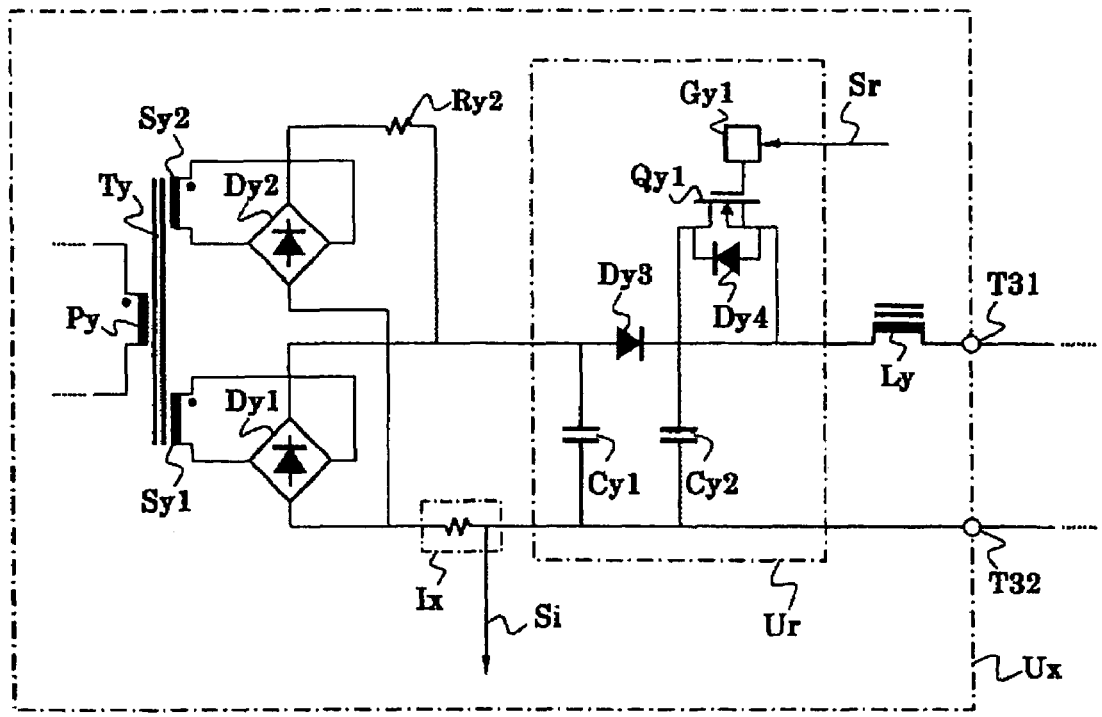
FIG. 11 is a schematic view showing part of an embodiment of a discharge lamp lighting apparatus.

As the discharge lamp lighting apparatus for passing the second rush current pulse, the structure shown in FIG. 11 can be used in addition to those described above. Although the rush current supply unit (Ur) comprises only the smoothing capacitor (Cy1) in the structure of FIG. 5, the rush current supply unit (Ur) is added to the structure in FIG. 11. Since the structure of part in the upstream side of the transformer (Ty) is omitted, since the structure thereof is the same as the above.

In the rush current supply unit (Ur) of this figure, the capacitor (Cy2) for rush current is provided, and is charged through a diode (Dy4) from the resistor (Ry2) at the time of impression of the release voltage in no-load state while the smoothing capacitor (Cy1) is charged. The electric discharge from the capacitor (Cy2) is carried out under control of the additional rush current enabling signal (Sr) through a gate driving circuit (Gy1), by the switching element (Qy1) using FET etc. Moreover, diode (Dy3) is provided so that the current may not flow in a reverse direction to the smoothing capacitor (Cy1). In addition, when the parasitism diode which serves as the forward direction diode from a source terminal toward a drain terminal, the switching element (Qy1) such as MOSFET is built in, the diode (Dy4) is unnecessary.

Thus, the operation of the discharge lamp lighting apparatus is fundamentally the same as that was shown a solid line and dashed line of FIG. 10. That is, if the additional rush current enabling signal (Sr) is activated in time (t2), the switching element (Qy1) is turned on, and the electric charge of the capacitor (Cy2), which charged by the release voltage in no-load state, is discharged, so that the second rush current pulse which has a peak value (Ir') is passed through as in a dashed line in FIG. 10.

In the above structure, the electrostatic capacity of the capacitor (Cy2) is set up, so that the peak value (Ir') is 22 A/mm$^2$ or less in a cross section of the cathode electrode (E1), so that even in case the xenon discharge lamp designed so that the temperature of a cathode electrode becomes low is turned on, the amount of heating which is rapidly applied to the cathode electrode by one rush current pulse is limited, whereby it is possible to offer the discharge lamp lighting apparatus capable of avoiding the bulb blackening phenomenon that tends to occur at initiation of a lamp lighting operation.

As described above, the discharge lamp lighting apparatus has the function for modulating the lamp current according to a modulation signal (Sm) on the basis of constant electric power control of lamp electric power. In relation to FIG. 3, the output current modulation circuit (Um) is configured so as to act to the lamp current detection signal converting circuit (Ai).

Figure 12:
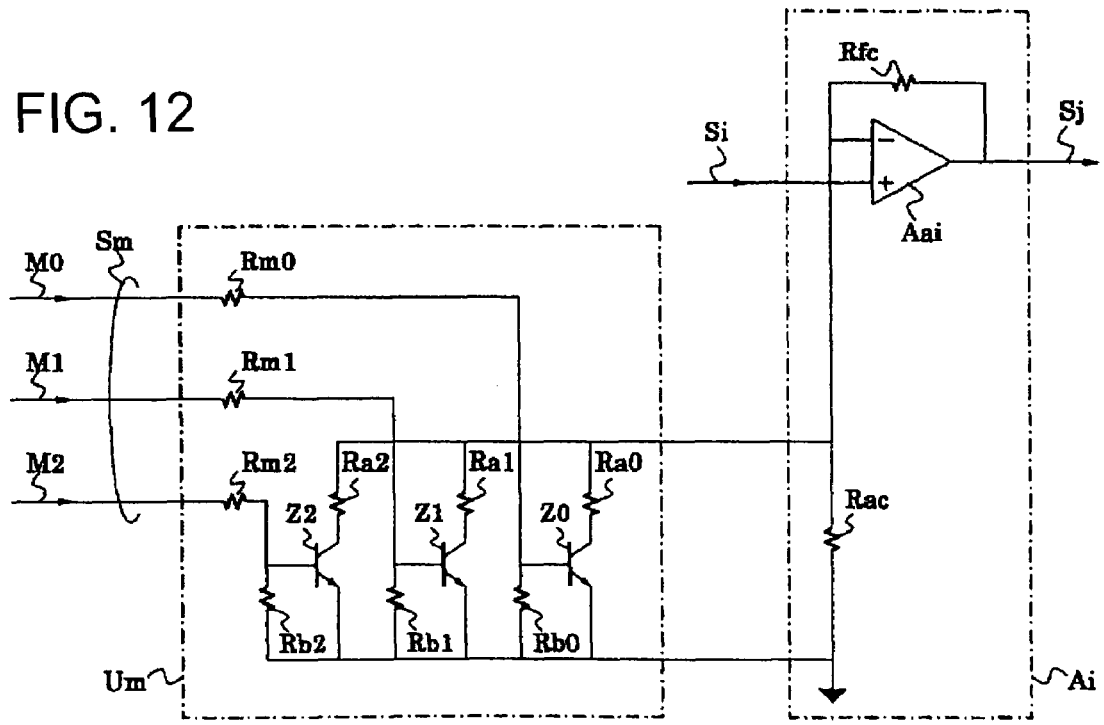
FIG. 12 is a schematic view showing part of an embodiment of a discharge lamp lighting apparatus.
Figure 13:
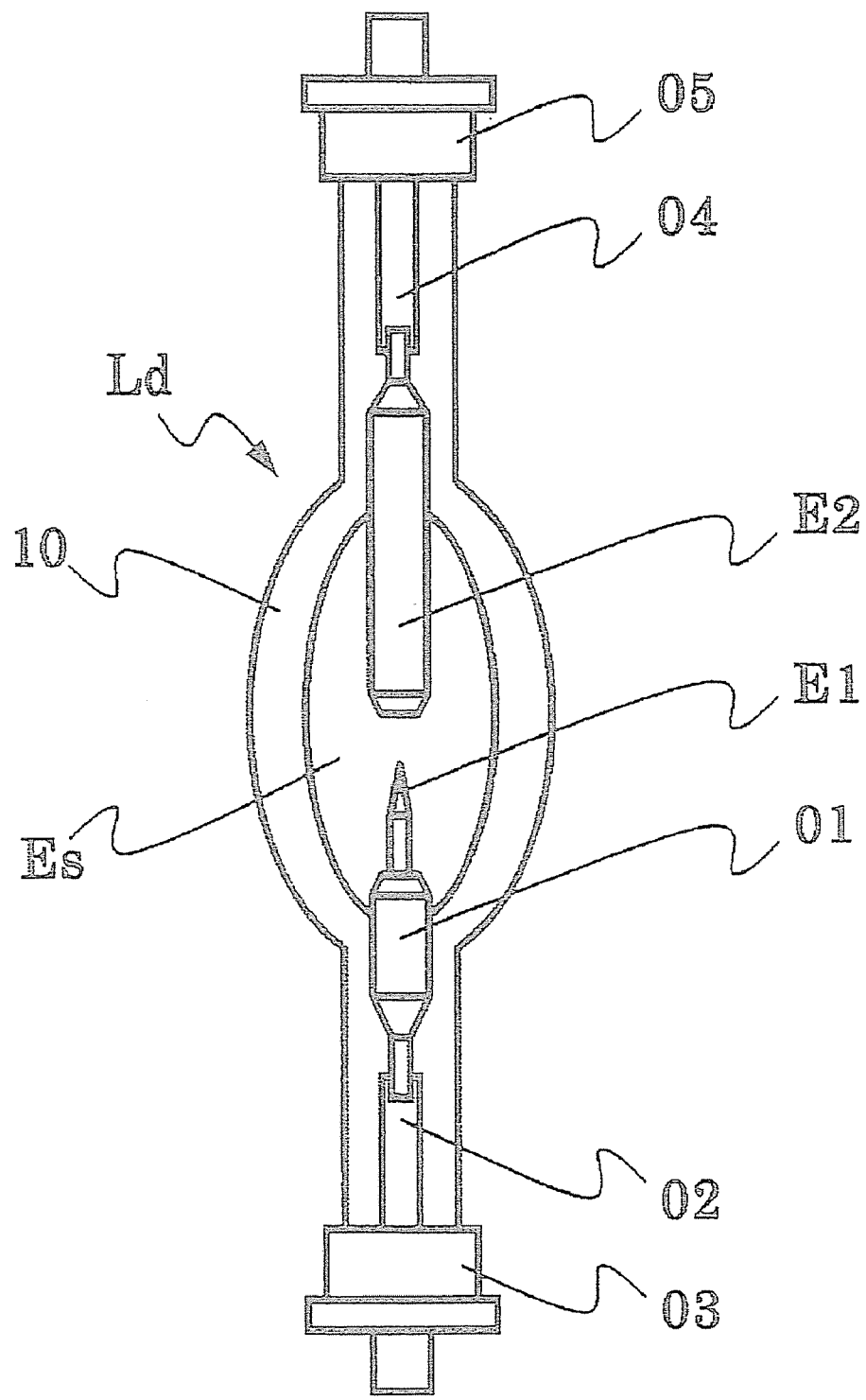
FIG. 13 is a conceptual diagram explaining the structure of a lamp of a discharge lamp lighting apparatus according to an embodiment.
Figure 14A:
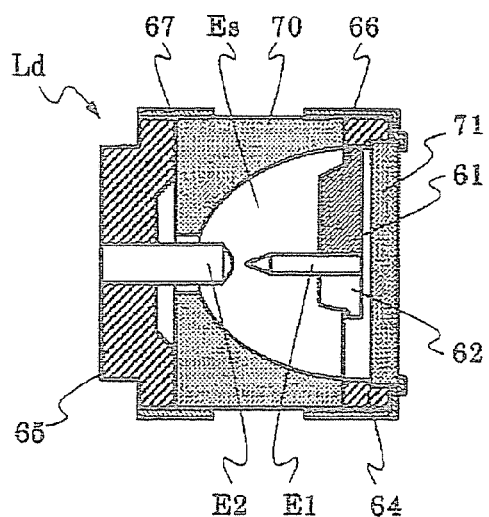
FIGS. 14A and 14B are conceptual diagrams for explaining the structure of a lamp of a discharge lamp lighting apparatus according to an embodiment.
Figure 14B:
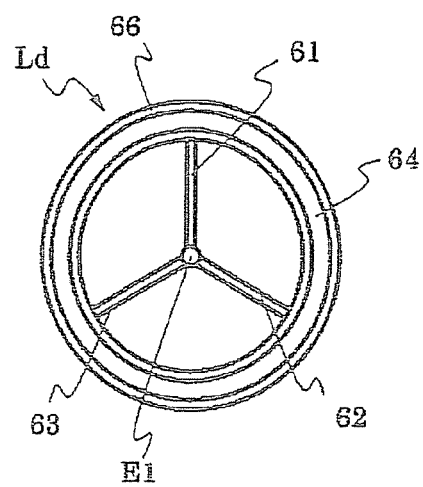
Figure 15A:
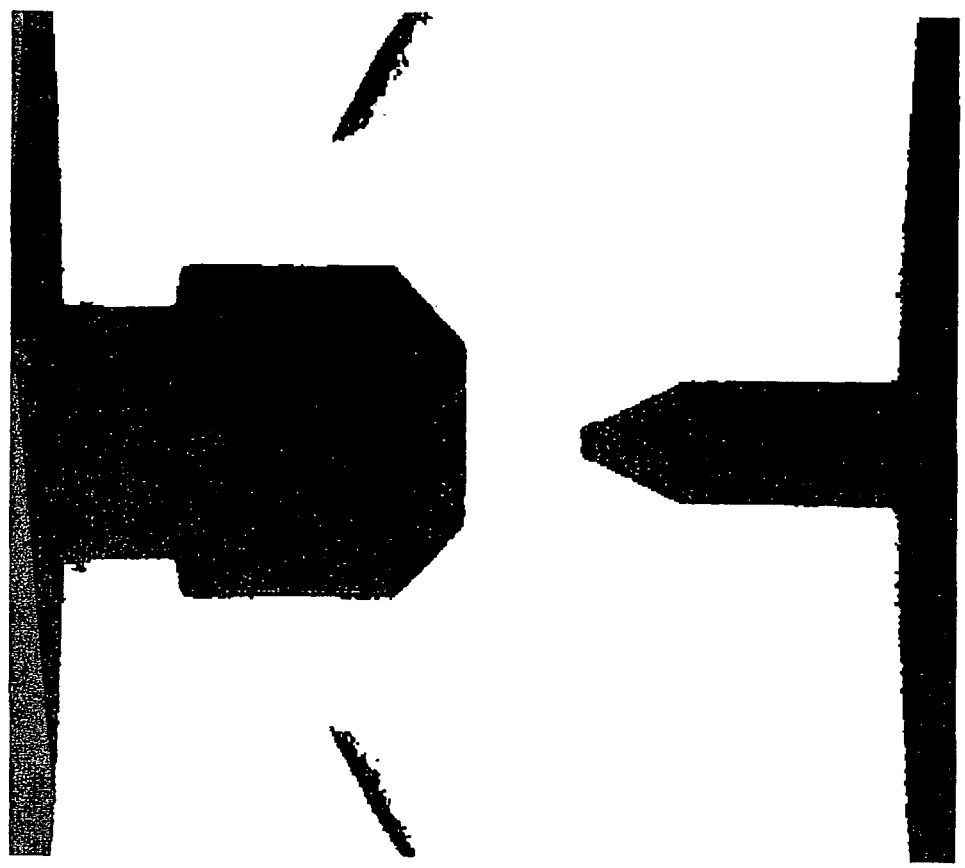
FIGS. 15A and 15 B are photographs explaining the feature of a lamp of a discharge lamp lighting apparatus according to an embodiment.
Figure 15B:
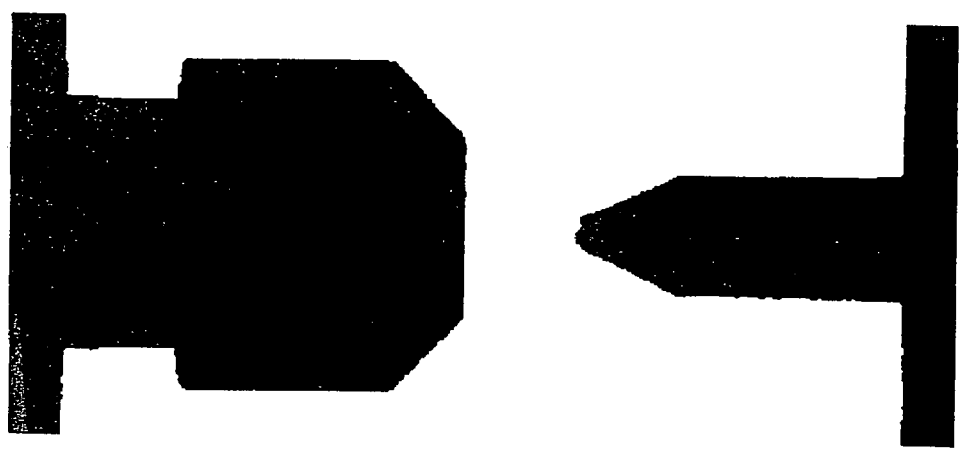

FIG. 12 is a schematic view showing an example of the structure of the concrete output current modulation circuit (Um), and the lamp current detection signal converting circuit (Ai). In the lamp current detection signal converting circuit of this figure, the lamp current detection signal (Si) is amplified by the operational amplifier (Aai), on the basis of the noninverting amplifying circuit according to the operational amplifier (Aai) so that a lamp current correlation signal (Sj) is generated as the output signal.

Since an output of the operational amplifier (Aai) is divided by a combined resistance of a resistor (Rfc), a resistor (Rac) and a resistors which are connected to the resistor (Rac), and is outputted to the inverting input terminal of the operational amplifier (Aai), the gain of the non-inverting amplifying circuit is determined by the voltage dividing ratio. Since the switching elements (Z0, Z1, Z2), each of which is a transistor, are inserted, between the resistors (Ra0, Ra1, Ra2) connected in parallel to the resistor (Rac) and the ground, respectively, it is possible to switch between a connection state and a non connection state of each of the resistors (Ra0, Ra1, Ra2) by turning on and off the corresponding switching element (Z0, Z1, Z2), so that the gain of this non-inverting amplifying circuit can be changed.

Since modulation data (M0, M1, M2) is inputted to the base terminals of the switching elements (Z0, Z1, Z2) through the respective base resistors (Rm0, Rm1, Rm2), the switching elements (Z0, Z1, Z2) are controlled so as to be in an ON state or an OFF state, corresponding to the truth or false of respective bits of the modulation data (M0, M1, M2). As a result, it is possible to change the gain of the non-inverting amplifying circuit based on a combination of the truth and false of the bits of the modulation data (M0, M1, M2).

As for the relation of the resistances of resistors (Ra0, Ra1, Ra2), by setting up the resistance of a resistor (Ra0) twice that of a resistor (Ra1), and the resistance of resistor (Ra1) twice that of the resistor (Ra2), it is possible to change the gain of the non-inverting amplifier circuit based on three bit binary numeric data in which modulation data (M0) is the least significant bit, and modulation data (M2) is the most significant bit. However, there is no direct relation between the gain and binary numeric data of the non-inverting amplifier circuit. In addition, although an example of the three bit is shown above, the number of bits can be increased or decreased if needed, so as to configure the structure.

Of course, the discharge lamp lighting apparatus has a function of modulating the magnitude of the lamp current according to the modulation signal (Sm) on the basis of constant electric power control. In addition to the structure of the discharge lamp lighting apparatus of FIG. 3 formed by using the circuit of FIG. 12 as described above, it is possible to realize the discharge lamp lighting apparatus by other structures.

For example, it is also possible to realize it on the basis of the structure of FIG. 1 formed by using the circuit shown in FIG. 8. In particular, as described above, the voltage source (Vm) is configured so that the lamp current target value obtained by dividing a predetermined lamp electric power target value by a value of the lamp voltage detection signal (Sv) outputted from the lamp voltage detection unit (Vx) is converted from digital to analog (DA conversion), so that the converted value is outputted as a voltage of the voltage source (Vm) shown in FIG. 8.

Although a use in a projector is mainly explained in this specification, the discharge lamp lighting apparatus of the embodiments can be applied to any uses, and good result or effects can be attained, as long as the discharge lamp lighting apparatus is used for turning on a xenon discharge lamp. In particular, in the use for lighting according to light source intensity modulation, it is especially suitable to extend the life span of a lamp.

In this specification, the circuit structures are described at minimum, in order to explain the operations and the functions of the light source apparatuses according to the embodiments. Therefore, details of the circuit structures or the operations are determined at the design thereof. That is, for example, determinations of the polarity of signals, or originality and creativity, such as selections, additions, or omissions of concrete circuit elements, convenience of procurements of elements, or changes based on economic reasons are premised on being carried out at the time of the design of actual apparatus.

The mechanism for especially protecting circuit elements, such as switching elements (for example, FET) of a power supply apparatus, from breakage factors, such as an overvoltage, and overcurrent, or overheating, or the mechanism for reducing a radiation noise or a conduction noise, generated with an operation of the circuit element of the power supply apparatus or preventing the generated noise from coming out to the outside, for example, a snubber circuit, and a varistor, a clamp diode, a current restriction circuit (including a pulse by pulse system), a noise filter choke coil of a common mode, or normal mode, a noise filter capacitor, etc. are premised on being added to each part of circuit arrangement shown in the embodiments if needed. The structure of the discharge lamp lighting apparatus is not limited to the circuits disclosed in this specification, or nor waveforms or timing charts described herein.

The preceding description has been presented only to illustrate and describe exemplary embodiments of the projector and discharge lamp lighting apparatus therefor according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for lighting a discharge lamp having a discharge container in which discharge medium including xenon is enclosed, and a pair of a cathode electrode and an anode electrode which face each other, in which at least a cathode electrode thereof contains electron emission nature substance, comprising:
 a starter which generates high voltage at initiation so as to generate dielectric breakdown in the discharge container of the discharge lamp; and
 a power supply circuit which supply discharge current to the discharge lamp,
 wherein the power supply circuit has an output current modulation circuit which modulates a magnitude of current flowing through the discharge lamp at least in a steady state,
 Wherein the output current modulation circuit controls a change speed in case a lamp current per square millimeter in a cross section of the cathode electrode is increased, to be 3.9 A per millisecond or less,
 wherein the power supply circuit carries out control in which an average current in the steady state is set so that an odd-shape portion is formed at a tip of the cathode electrode.

2. A discharge lamp lighting apparatus for lighting a discharge lamp having a discharge container in which discharge medium including xenon is enclosed, and a pair of a cathode electrode and an anode electrode which face each other, in which at least a cathode electrode thereof contains electron emission nature substance, comprising:
 a starter which generates high voltage at initiation so as to generate dielectric breakdown in the discharge container of the discharge lamp; and
 a power supply circuit which supplies discharge current to the discharge lamp,
 wherein the power supply circuit has a rush current supply unit which passes rush current through the discharge lamp at initiation,
 wherein the rush current supply unit supply rush current in form of one or more pulse current whose peak value is 22 A per square millimeter in a cross section of the cathode electrode, and
 wherein the power supply circuit carries out control in which an average current in the steady state is set so that an odd-shape portion is formed at a tip of the cathode electrode.

3. The discharge lam lighting apparatus according to claim 2, wherein the power supply circuit includes an output current modulation circuit which modulates a current flowing through the discharge lamp at least in the steady state and the output current modulation circuit controls a change speed in case a lamp current per square millimeter in a cross section of the cathode electrode is increased, to be 3.9 A per millisecond or less.

4. A projector which displays a projection image by using color sequential light flux which converted by a dynamic filter from light flux generated by a discharge lamp, wherein the discharge lamp is initiated by the discharge lamp lighting apparatus according to claim 1.

5. A projector which displays a projection image by using color sequential light flux which converted by a dynamic filter from light flux generated by a discharge lamp, wherein the discharge lamp is initiated by the discharge lamp lighting apparatus according to claim 2.

* * * * *